(12) United States Patent
Kojima et al.

(10) Patent No.: US 7,696,118 B2
(45) Date of Patent: *Apr. 13, 2010

(54) DIELECTRIC CERAMIC COMPOSITION, ELECTRONIC DEVICE AND THE PRODUCTION METHOD

(75) Inventors: Mitsuru Kojima, Narita (JP); Miyuki Yanagida, Narita (JP); Masakazu Hosono, Abiko (JP); Yasuo Watanabe, Narita (JP); Akira Sato, Inba-gun (JP)

(73) Assignee: TDK Corporation, Tokyo (JP)

( * ) Notice: Subject to any disclaimer, the term of this patent is extended or adjusted under 35 U.S.C. 154(b) by 225 days.

This patent is subject to a terminal disclaimer.

(21) Appl. No.: 11/808,334

(22) Filed: Jun. 8, 2007

(65) Prior Publication Data

US 2008/0004172 A1    Jan. 3, 2008

(30) Foreign Application Priority Data

Jun. 12, 2006    (JP) ............................. 2006-162795

(51) Int. Cl.
    *C04B 35/468*    (2006.01)
(52) U.S. Cl. ..................................... 501/139
(58) Field of Classification Search ................. 501/139
    See application file for complete search history.

(56) References Cited

U.S. PATENT DOCUMENTS 6,245,433 B1    6/2001    Nakamura et al.
6,544,916 B1 *  4/2003    Sato et al. .................... 501/137
6,999,302 B2    2/2006    Ito et al.
7,399,724 B2 *  7/2008    Yanagida et al. ............. 501/139
7,550,402 B2 *  6/2009    Ito et al. ...................... 501/139

FOREIGN PATENT DOCUMENTS

| JP | A 08-124785 | 5/1996 |
| JP | A-2006-013290 | 1/2006 |
| KR | 1999-0088226 A | 12/1999 |

* cited by examiner

*Primary Examiner*—Karl E Group
(74) *Attorney, Agent, or Firm*—Oliff & Berridge, PLC

(57) ABSTRACT

A production method of a dielectric ceramic composition comprising a main component including barium titanate expressed by a composition formula of $Ba_m TiO_{2+m}$, wherein "m" satisfies $0.990<m<1.010$, a fourth subcomponent including an oxide of R (note that R is at least one selected from Y, La, Ce, Pr, Nd, Pm, Sm, Eu, Gd, Tb, Dy, Ho, Er, Tm, Yb and Lu), and other subcomponent including at least BaO; comprising steps of preparing a post-reaction material by bringing a material of said main component to react in advance with at least a part of a material of said fourth subcomponent, wherein, when an amount of BaO included in said other subcomponent is n mole with respect to 100 moles of said main component, and said main component and said BaO are expressed by a composition formula of $Ba_{m+n/100}TiO_{2+m+n/100}$, wherein "m" and "n" satisfy $0.994<m+n/100<1.014$; by which a dielectric ceramic composition capable of improving the specific permittivity without deteriorating the capacity-temperature characteristic, IR and IR accelerated lifetime, etc. and the production method can be provided.

7 Claims, 1 Drawing Sheet

DIELECTRIC CERAMIC COMPOSITION, ELECTRONIC DEVICE AND THE PRODUCTION METHOD

BACKGROUND OF THE INVENTION

1. Field of the Invention

The present invention relates to a dielectric ceramic composition used as a dielectric layer of an electronic device, such as a multilayer ceramic capacitor, a production method thereof, and an electronic device comprising the dielectric ceramic composition as the dielectric layer.

2. Description of the Related Art

A multilayer ceramic capacitor as an example of electronic devices is produced, for example, by printing internal electrodes in a predetermined pattern on a ceramic green sheet formed by a predetermined dielectric ceramic composition, alternately stacking the results to make it as one body, and co-firing a thus obtained green chip. Since internal electrode layers of the multilayer ceramic capacitor are formed to be one body with ceramic dielectric by firing, materials not reacting with the ceramic dielectric has to be selected. Therefore, in the related art, it has been necessary to use expensive precious metals, such as platinum and palladium, as the material composing the internal electrode layer.

In recent years, however, dielectric ceramic compositions using inexpensive base metals, such as nickel and copper, have been developed and a drastic reduction of costs has been realized.

Also, in recent years, demands for downsizing of electronic devices have become stronger along with electronic circuits becoming higher in density, and multilayer ceramic capacitors have rapidly become downsized with a larger capacity. To attain a downsized multilayer ceramic capacitor with a larger capacity, a method of making dielectric layers thinner and a method of heightening specific permittivity of a dielectric ceramic composition included in dielectric layers, etc. have been generally used. However, when dielectric layers are made thin, an electric field imposed on the dielectric layers becomes stronger at the time of applying a direct current voltage, consequently, there has been a disadvantage that a change of the specific permittivity with time, that is, a change of the capacity with time becomes remarkably large.

To improve a change of the capacity with time under a direct current voltage, there has been proposed a method of using dielectric particles having a small average crystal grain diameter as dielectric particles to be included in the dielectric layers (for example, refer to the Japanese Unexamined Patent Publication No. H08-124785). The Japanese Unexamined Patent Publication No. H08-124785 discloses a dielectric ceramic composition having a specific composition, wherein an average crystal grain diameter of the dielectric particles is 0.45 μm or smaller. However, the dielectric ceramic composition described in the article has too low specific permittivity to respond to downsizing and obtaining of a larger capacity.

SUMMARY OF THE INVENTION

An object of the present invention is to provide a dielectric ceramic composition, wherein specific permittivity can be improved without deteriorating other electric characteristics (for example, a temperature characteristic of capacitance, insulation resistance (IR), an accelerated lifetime of IR and a dielectric loss), and a production method thereof. Another object of the present invention is to provide an electronic device, such as a multilayer ceramic capacitor, comprising a dielectric layer formed by the dielectric ceramic composition as above.

The present inventors found by focusing not only on a mole ratio of Ba and Ti in barium titanate used as a material of a main component but also on BaO included as a subcomponent that the specific permittivity, a capacity-temperature characteristic, an IR accelerated lifetime and a dielectric loss, etc. at high levels can be attained by setting the mole ratio of Ba and Ti included in the dielectric ceramic composition to be in a predetermined range by the main component and BaO; and completed the present invention.

Namely, according to the present invention, there is provided a production method of a dielectric ceramic composition comprising a main component including barium titanate expressed by a composition formula of $Ba_m TiO_{2+m}$, wherein "m" satisfies $0.990 < m < 1.010$, a fourth subcomponent including an oxide of R (note that R is at least one selected from Y, La, Ce, Pr, Nd, Pm, Sm, Eu, Gd, Tb, Dy, Ho, Er, Tm, Yb and Lu), and other subcomponent including at least BaO; comprising steps of:

preparing a post-reaction material by bringing a material of the main component to react in advance with at least a part of a material of the fourth subcomponent;

wherein, when an amount of BaO included in the other subcomponent is n mole with respect to 100 moles of the main component and the main component and the BaO are expressed by a composition formula of $Ba_{m+n/100} TiO_{2+m+n/100}$, wherein "m" and "n" satisfy $0.994 < m+n/100 < 1.014$.

In the present invention, by bringing a material of the main component to react in advance with a part of a material of the fourth subcomponent, at least, the fourth subcomponent can be included inside particles of the main component. Note that it is sufficient if at least the fourth subcomponent exists inside of particles of the main component after the reaction. Namely, the fourth subcomponent may be unevenly or uniformly distributed inside of particles of the main component, and alternately, the content ratio may gradually change therein. As a result, the specific permittivity can be improved without deteriorating other electric characteristics (for example, a temperature characteristic of the capacitance, insulation resistance, accelerated lifetime of insulation resistance and dielectric loss).

Furthermore, in the composition formula of $Ba_m TiO_{2+m}$ as a main component, by setting a value of "m" indicating a mole ratio of Ba and Ti to be in the above range, the above characteristics can become preferable. Also, in addition a value of "m" of the main component material, by setting a value of "m+n/100" indicating a mole ratio of Ba and Ti in the dielectric ceramic composition to be in the above range by changing an adding quantity of BaO as a subcomponent, the specific permittivity can be maintained high and a temperature characteristic of the capacitance and an accelerated lifetime of the insulation resistance can become preferable.

In the present invention, preferably, in the step for obtaining a post-reaction material, the material of the main component and at least a part of the material of the fourth subcomponent are dispersed as solid solution in advance. Due to the dispersion as solid solution, the fourth subcomponent can be uniformly dispersed as solid solution in the main component and the above electric characteristics can be furthermore improved.

In the present invention, "reaction" is used as a concept including solid dispersion and coating, etc. and includes a method for creating a state where the fourth subcomponent exists inside the main component.

In the present invention, preferably, steps of preparing a post-reaction material by bringing the material of the main component to react in advance with a part of the material of the fourth subcomponent to be included in the dielectric ceramic composition, and adding rest of the material of the fourth subcomponent to be included in the dielectric ceramic composition and a material to be included as BaO in the dielectric ceramic composition included into the post-reaction material.

In the present invention, a material of the fourth subcomponent to be reacted with a material of the main component is preferably not all but a part of the fourth subcomponent to be included in the dielectric ceramic composition. Then, the obtained post-reaction material is preferably added with the rest of the material of the fourth subcomponent and materials to be included as BaO in the dielectric ceramic composition, calcined if necessary, and, then, fired. Accordingly, the main component and BaO are preferably not reacted in advance. As a result, the effects of the present invention can be enhanced.

In the present invention, a content of the fourth subcomponent in the dielectric ceramic composition to be obtained finally is preferably 0.1 to 10 moles and, more preferably, 0.2 to 6 moles with respect to 100 moles of the main component in terms of R.

In the present invention, by setting the content of the fourth subcomponent included in the dielectric ceramic composition to be in the above range, a temperature characteristic of the capacitance can be improved. When the content of the fourth subcomponent is too small, the effects of the fourth subcomponent cannot be obtained and the temperature characteristic of the capacitance tends to decline, while when too much, the sinterability tends to decline.

In the present invention, a content of the fourth subcomponent to be reacted in advance with the material of the main component is preferably more than 0 to 0.5 mole with respect to 100 moles of the main component in terms of R.

Alternatively, in the present invention, a ratio of the fourth subcomponent to be reacted in advance with the material of the main component is preferably more than 0 to less than 50 mol % and, more preferably, more than 0 to 25 mol % with respect to 100 mol % of a total amount of the fourth subcomponent to be finally included in the dielectric ceramic composition in terms of R.

When a content of the material of the fourth subcomponent to be reacted in advance with the material of the main component is too large, a crystal grain diameter of a sintered body to be obtained after firing becomes too large and it is liable that the temperature characteristic declines and the insulation resistance (IR) declines.

In the present invention, preferably, the other subcomponent includes a first subcomponent, a second subcomponent and a third subcomponent, the first subcomponent includes at least one selected from MgO, CaO, BaO and SrO, the second subcomponent includes $SiO_2$ mainly and at least one selected from MO (note that M is at least one selected from Mg, Ca, Ba and Sr), $Li_2O$ and $B_2O_3$, and a third subcomponent includes at least one selected from $V_2O_5$, $MoO_3$ and $WO_3$; and ratios of the respective subcomponents with respect to 100 moles of the main component are the first subcomponent: 0.1 to 5 moles, the second subcomponent: 0.1 to 12 moles, and the third subcomponent: more than 0 to 0.3 mole.

In the present invention, preferably, the other subcomponent furthermore includes a fifth subcomponent including at least one selected from MnO and $Cr_2O_3$, and a ratio of the fifth subcomponent with respect to 100 moles of the main component is 0.05 to 1.0 mole.

In the present invention, as a result that the first to third subcomponents (more preferably, furthermore the fifth subcomponent) are included together with the fourth subcomponent, a temperature characteristic of the capacitance can be improved and, particularly, the X7R characteristics (−55 to 125° C., ΔC=within ±15%) of the EIA standard can be satisfied. Note that timing of adding the first to third and fifth subcomponents is not particularly limited, but it is preferable that the first to third and fifth subcomponents are added to the post-reaction material after the reaction of the main component material with at least a part of the fourth subcomponent material.

In the present invention, preferably, a material having an average particle diameter of 0.05 to 0.5 μm and, more preferably, 0.1 to 0.4 μm is used as a material of the main component. By using a material of the main component having an average particle diameter of the above range, an average crystal grain diameter of dielectric particles after sintering can become preferably as fine as 0.1 to 0.3 μm, so that a change of specific permittivity with time can be reduced.

A dielectric ceramic composition according to the present invention is a dielectric ceramic composition produced by any one of the above methods.

An electronic device according to the present invention comprises a dielectric layer composed of the dielectric ceramic composition explained above. The electronic device is not particularly limited and multilayer ceramic capacitors, piezoelectric elements, chip inductors, chip varisters, chip thermisters, chip resistors and other surface mounted (SMD) chip type electronic devices may be mentioned.

According to the present invention, as a result that a material of the main component and at least a part of a material of the fourth subcomponent are reacted in advance, it is possible to provide a dielectric ceramic composition capable of improving the specific permittivity without deteriorating other electric characteristics (for example, a temperature characteristic of capacitance, insulation resistance, accelerated lifetime of insulation resistance and dielectric loss), and the production method. Furthermore, by setting a value of "m" in the composition formula of $Ba_m TiO_{2+m}$ and a value of "m+n/100" in the composition formula of $Ba_{m+n/100}TiO_{2+m+n/100}$ to be in specific ranges, particularly, the specific permittivity can be maintained high and a temperature characteristic of the capacitance and an accelerated lifetime of insulation resistance can become preferable. Also, according to the present invention, it is also possible to provide an electronic device, such as a multilayer ceramic capacitor, comprising a dielectric layer composed of the dielectric ceramic composition as above.

BRIEF DESCRIPTION OF DRAWINGS

These and other objects and features of the present invention will become clearer from the following description of the preferred embodiments given with reference to the attached drawing, in which.

DESCRIPTION OF THE PREFERRED EMBODIMENT

Multilayer Ceramic Capacitor 1

Figure 1:
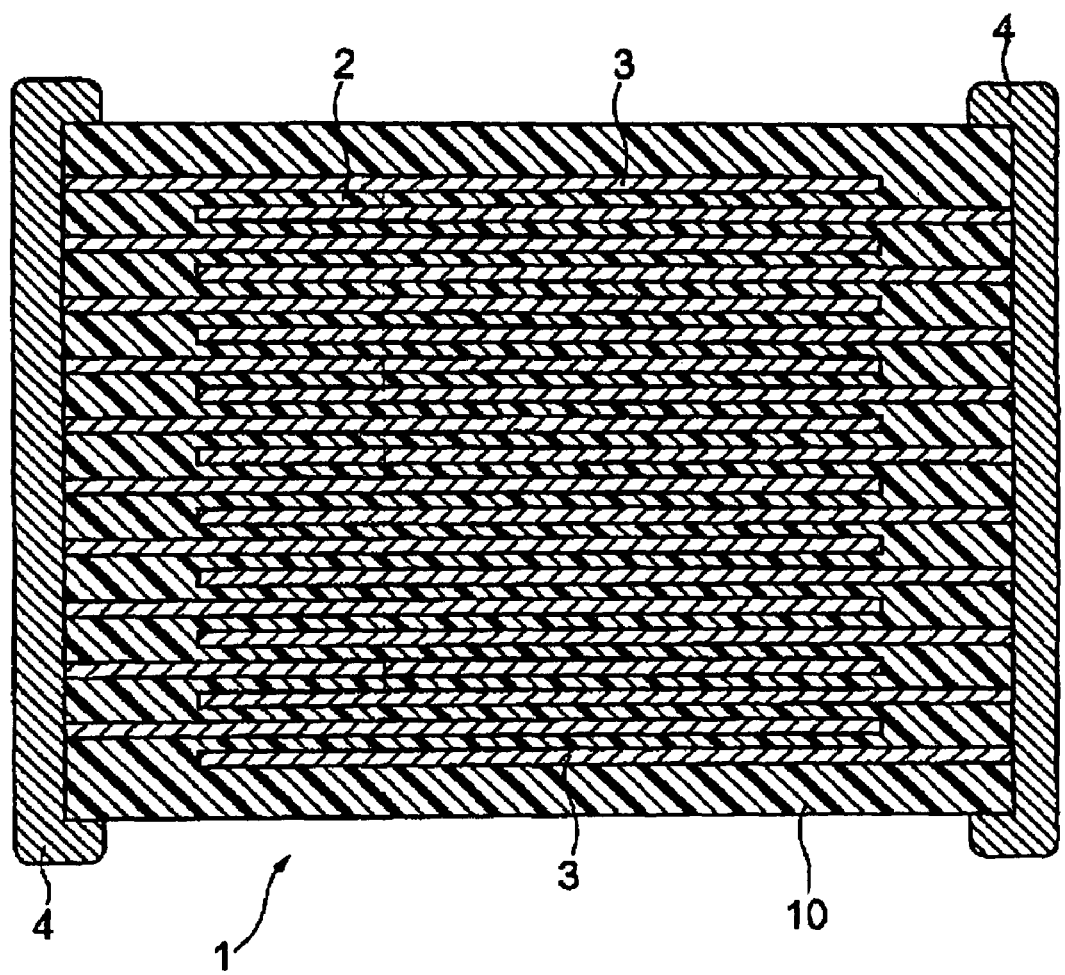
FIG. 1 is a sectional view of a multilayer ceramic capacitor according to an embodiment of the present invention.

As shown in FIG. 1, a multilayer ceramic capacitor 1 according to an embodiment of the present invention has a capacitor element body 10 configured by alternately stacking dielectric layers 2 and internal electrode layers 3. On both end portions of the capacitor element body 10, a pair of external electrodes 4 respectively conducting to the internal electrode layers 3 alternately arranged inside the element body 10 are formed. A shape of the capacitor element body 10 is not particularly limited but is normally a rectangular parallelepiped shape. Also, a size thereof is not particularly limited and may be suitably determined in accordance with the use object.

The internal electrode layers 3 are stacked, so that respective end surfaces thereof are exposed to surfaces of two facing end portions of the capacitor element body 10. The pair of external electrodes 4 are formed on both end portions of the capacitor element body 10 and connected to the exposed end surfaces of the alternately arranged internal electrode layers 3 so as to configure a capacitor circuit.

Dielectric Layer 2

The dielectric layers 2 include a dielectric ceramic composition.

In the present embodiment, the dielectric ceramic composition includes a main component including barium titanate expressed by a composition formula $Ba_mTiO_{2+m}$, wherein "m" satisfies $0.990<M<1.010$, a fourth subcomponent including an oxide of R (note that R is at least one kind selected from Y, La, Ce, Pr, Nd, Pm, Sm, Eu, Gd, Tb, Dy, Ho, Er, Tm, Yb and Lu) and, as other subcomponents, first to third and fifth subcomponents. Note that BaO is included in the first subcomponent and/or the second subcomponent.

As the main component, barium titanate expressed by a composition formula $Ba_mTiO_{2+m}$, wherein "m" satisfies $0.990<m<1.010$, is included. The "m" indicates a mole ratio of Ba and Ti, that is, Ba/Ti and preferably satisfies $0.990<m<0.995$ and $0.995 \leq m \leq 1.00$. When the "m" value is in the above range, the specific permittivity can be maintained high, and a temperature characteristic of capacitance and IR accelerated lifetime can become preferable. When the "m" value is too small, dielectric particles result in grain growth and the IR accelerated lifetime tends to be deteriorated; while when too large, sinterability declines, and the specific permittivity and IR accelerated lifetime tend to deteriorate.

The fourth subcomponent includes an oxide of R. An R element of the oxide of R is at least one kind of element selected from Y, La, Ce, Pr, Nd, Pm, Sm, Eu, Gd, Tb, Dy, Ho, Er, Tm, Yb and Lu. Among them, Y, Pm, Sm, Eu, Gd, Tb, Dy, Ho, Er, Tm, Yb and Lu are preferable and Y, Tb and Yb are furthermore preferable.

The fourth subcomponent has an effect of improving the IR accelerated lifetime characteristic. A content of the fourth subcomponent is preferably 0.1 to 10 moles, and more preferably 0.2 to 6 moles, when calculated in conversion of R. When the content is too small, the effect of adding the fourth subcomponent cannot be obtained and the capacity-temperature characteristic declines. While when the content is too large, the sinterability tends to deteriorate. Note that, as will be explained later on, the production method of the present embodiment comprises a step of reacting in advance at least a part of a material of the fourth subcomponent with a material of the main component.

Also, the above dielectric ceramic composition includes other subcomponent including at least BaO.

When BaO in an amount of n mole is included with respect to 100 moles of the main component, the main component and BaO can be expressed by a composition formula of $Ba_{m+n/100}TiO_{2+m+n/100}$. Namely, a value of "m+n/100" indicates a mole ratio of Ba and Ti in the entire dielectric ceramic composition. In that case, by setting the "m" and "n" in the composition formula to be in a range of $0.994<m+n/100<1.014$, and preferably $0.994<m+n/100<1.010$, the specific permittivity, a temperature characteristic of the capacitance and the IR accelerated lifetime, etc. can be maintained at high levels. When the value of "m+n/100" is too small, a crystal grain diameter of a sintered body becomes large and the capacity-temperature characteristic tends to decline, while when the value of "m+n/100" is too large, it is liable that the specific permittivity declines and the IR lifetime declines. Note that it is sufficient that BaO exists as BaO in the dielectric ceramic composition after firing, and the above effects are not changed by forms of materials at the time of adding them.

In the present embodiment, other subcomponents than the fourth subcomponent including an oxide of R as explained above are preferably first to third and fifth subcomponents below.

The first subcomponent is at least one kind selected from MgO, CaO, BaO and SrO, and the second subcomponent mainly includes $SiO_2$ and preferably includes at least one kind selected from MO (note that M is at least one selected from Mg, Ca, Ba and Sr), $Li_2O$ and $B_2O_3$. BaO may be included in the first subcomponent and/or in the second subcomponent. It is preferable that the third subcomponent is at least one kind selected from $V_2O_5$, $MoO_3$ and $WO_3$ and the fifth subcomponent is at least one selected from MnO and $Cr_2O_3$.

Ratios of the respective subcomponents to the main component are, when calculated as a conversion of each oxide, the first subcomponent: 0.1 to 5 moles,
the second subcomponent: 0.1 to 12 moles,
the third subcomponent: more than 0 to 0.3 mole, and
the fifth subcomponent: 0.05 to 1.0 mole; and more preferably,
the first subcomponent: 0.2 to 4 moles,
the second subcomponent: 1 to 6 moles,
the third subcomponent: more than 0 to 0.25 mole, and
the fifth subcomponent: 0.05 to 0.4 mole with respect to 100 moles of the main component.

In the present embodiment, as a result that the first to third and fifth subcomponents are furthermore included in the dielectric ceramic composition in addition to the fourth subcomponent including the oxide of R, a temperature characteristic of the capacitance can be improved and, preferably, the X7R characteristics (−55 to 125° C. and $\Delta c$=within ±15%) of the EIA standard can be satisfied.

Note that, in the present specification, oxides composing the main component and subcomponents are expressed by a stoichiometric composition, but an oxidization state of each of the oxides may be deviated from the stoichiometric composition. Note that the above ratios of the respective subcomponents are obtained by calculating as a conversion of oxides having stoichiometric composition based on metal amounts included in the oxides composing the subcomponents.

The reasons of limiting contents of the subcomponents are as below.

When a content of the first subcomponent (MgO, CaO, BaO and SrO) is too small, the temperature change rate of capacitance becomes high. On the other hand, when the content is too much, it is liable that the sinterability declines and the high temperature load lifetime deteriorates. Note that component ratios of respective oxides in the first subcomponent may be any.

The second subcomponent includes $SiO_2$ as the main component and at least one selected from MO (note that M is at least one selected from Mg, Ca, Ba and Sr), $Li_2O$ and $B_2O_3$. The second subcomponent mainly acts as a sintering aid. The first subcomponent also includes MO (note that M is at least one selected from Mg, Ca, Ba and Sr), but when MO is made to be a composite oxide with $SiO_2$ and to be a compound expressed by a composition formula $M_xSiO_{2+x}$, the melting point can be lowered. Since the melting point can be lowered, reactivity with the main component can be improved. Note that when using BaO and CaO as the MO, the composite oxide is preferably a compound expressed by a composition formula of $(Ba, Ca)_xSiO_{2+x}$. The "x" in the composition formula of $(Ba, Ca)_xSiO_{2+x}$ is preferably 0.8 to 1.2, and more preferably 0.9 to 1.1. When the "x" is too small, that is, when the content of $SiO_2$ is too much, it reacts with the main component $Ba_mTiO_{2+m}$ to deteriorate the dielectric characteristic. On the other hand, when the "x" is too large, the melting point becomes high to deteriorate the sinterability, which is unfavorable.

The third subcomponent ($V_2O_5$, $MoO_3$ and $WO_3$) exhibits an effect of flattening the capacity-temperature characteristic at the Curie's temperature or higher and an effect of improving the high temperature load lifetime. When a content of the third subcomponent is too small, the effects become insufficient. On the other hand, when the content is too large, the IR declines remarkably. Note that component ratios of respective oxides in the third subcomponent may be any.

The fifth subcomponent (MnO and $Cr_2O_3$) has effects of shifting the Curie's temperature to the high temperature side, flattening the capacity-temperature characteristic, improving the insulation resistance (IR), improving the breakdown voltage and lowering the firing temperature, etc.

An average crystal grain diameter of dielectric particles included in the dielectric ceramic composition is not particularly limited, but 0.1 to 0.3 μm is preferable. When the average crystal grain diameter is too small, the specific permittivity tends to become low, while when too large, a change of specific permittivity with time tends to become large. An average crystal grain diameter of the dielectric particles can be measured by the code method for measuring an average particle diameter, for example, from a SEM image of the dielectric particles on an assumption that shapes of the dielectric particles are sphere.

A thickness of the dielectric layers 2 is not particularly limited, but 4.5 μm or thinner per one layer is preferable, 3.5 μm or thinner is more preferable, and 3.0 μm or thinner is furthermore preferable. A lower limit of the thickness is not particularly limited and is, for example, 0.5 μm or so.

The number of stacked layers of the dielectric layers 2 is not particularly limited, but 20 or larger is preferable, 50 or larger is more preferable, and 100 or larger is particularly preferable. An upper limit of the number of stacked layers is not particularly limited and is, for example, 2000 or so.

Internal Electrode Layer 3

A conductive material included in the internal electrode layers 3 is not particularly limited, but since components of the dielectric layers 2 has reduction-resistance, relatively inexpensive base metals may be used. As base metals to be used as the conductive material, Ni or a Ni alloy is preferable. As a Ni alloy, alloys of one or more kinds of elements selected from Mn, Cr, Co and Al with Ni are preferable, and a Ni content in the alloy is preferably 95 wt % or larger. Note that Ni or a Ni alloy may include a variety of trace components, such as P, in an amount of not larger than 0.1 wt % or so. A thickness of the internal electrode layers 3 may be suitably determined in accordance with the use object, etc., but normally it is 0.1 to 3 μm, and particularly 0.2 to 2.0 μm or so is preferable.

External Electrode 4

A conductive material to be included in the external electrodes 4 is not particularly limited and inexpensive Ni, Cu and alloys of these may be used in the present invention. A thickness of the external electrodes 4 may be suitably determined in accordance with the use object, etc. but normally 10 to 50 μm or so is preferable.

Production Method of Multilayer Ceramic Capacitor

A multilayer ceramic capacitor of the present embodiment is produced by producing a green chip by a normal printing method or a sheet method using paste, firing the result, printing or transferring external electrodes and firing in the same way as in the multilayer ceramic capacitor in the related arts. Below, the production method will be explained specifically.

First, a dielectric ceramic composition powder included in the dielectric layer paste is fabricated.

In the present embodiment, the dielectric ceramic composition powder is fabricated as below. First, a material of the main component and a part of a material of the fourth subcomponent (a material corresponding to a part of the fourth subcomponent to be included in the dielectric ceramic composition) are reacted or preferably dispersed as solid solution in advance, so that a post-reaction material is obtained. Next, the post-reaction material is added with the rest of the fourth subcomponent material (remaining material in the fourth subcomponent for composing the dielectric ceramic composition) and the above first to third and fifth subcomponent materials including a material of BaO and subjected to calcination if necessary, so that a dielectric ceramic composition powder is fabricated.

As the above main component material, a $Ba_mTiO_{2+m}$ powder or a compound powder to be $Ba_mTiO_{2+m}$ when fired may be used, and an average particle diameter of the main component material is preferably 0.05 to 0.5 μm, and more preferably 0.1 to 0.4 μm. When an average particle diameter of the main component material is too large, an average crystal grain diameter of dielectric particles after sintering becomes too large and it is liable that the temperature characteristic is deteriorated and the insulation resistance (IR) declines. While, when the average particle diameter is too small, reaction of the main component material and an oxide of R tends to become uneven. Note that, in the present embodiment, the average particle diameter means a volume-reduced cumulative 50% diameter (D50 diameter), which can be measured by a laser diffraction method, etc. using light scattering.

As the fourth subcomponent material to be reacted in advance with the main component material, the oxides of R as above and a variety of compounds to be the oxides of R when fired may be used. As the oxides of R and the compounds to be the oxides of R when fired, powder materials having an average particle diameter of 0.01 to 0.1 μm or so or sol materials mentioned below, etc. may be used.

The sol materials are not particularly limited and, for example, hydroxide sol and oxide sol, etc. may be mentioned. Also, a sol particle diameter of the sol materials is normally 1 to 100 nm or so, and as the solvent, water; methanol, ethanol and other alcohols; xylene, toluene and other aromatic solvents, methylethylketone and other ketones; and other organic based solvents may be mentioned.

The compounds to be the oxides of R when fired are not particularly limited, and alkoxide of R and inorganic salt of R, etc. may be mentioned.

The alkoxide of R is a compound of alcohol and an R element and specifically a compound, wherein hydrogen of a hydroxyl group in alcohol is substituted by an R element. Alkoxide of R is not particularly limited and a variety of compounds expressed by a general formula of $C_nH_{2n+1}OR$ (n is an integer from 1 to 9) may be used, for example, $CH_3OR$, $C_2H_5OR$, n-$C_3H_7OR$, i-$C_3H_7OR$, etc. may be mentioned.

Also, the inorganic salt of R is not particularly limited and, for example, chlorides, nitrites, phosphates, sulfates, etc. may be mentioned. Note that inorganic salts of R are often in a hydrated state and normally used in a state of dissolved in water or a water-soluble organic solvent, etc.

The fourth subcomponent material to be reacted in advance with the main component material is preferably more than 0 to 0.5 mole, and more preferably 0.01 to 0.2 mole when calculated as a conversion of R with respect to 100 moles of the main component.

Alternatively, preferably, a ratio of the fourth subcomponent material to be reacted in advance is 0 to 50 mole % (note that 0 and 50 are not included) when calculated as a conversion of R with respect to a total amount of 100 mole % of the fourth subcomponent to be finally included in the dielectric ceramic composition, more preferably more than 0 to 25 mole % and furthermore preferably more than 0 to 15 mole %.

When an amount of the fourth subcomponent material to be reacted in advance with the main component is too much, a crystal grain diameter of a sintered body to be obtained after firing becomes too large and it is liable that the temperature characteristic declines and the insulation resistance (IR) declines.

As a method of obtaining the post-reaction material by reacting the main component material with a part of the fourth subcomponent material, a method of mixing the main component material and the fourth subcomponent material by using a solvent, etc., evaporating the solvent and calcining and a method of adding a precipitant to a mixed solution, depositing the fourth subcomponent on the main component and calcining, etc. may be mentioned. Note that a temperature at the calcination is preferably 500 to 700° C. or so.

Next, by adding the rest of the fourth subcomponent material (remaining material of the fourth subcomponent for composing the dielectric ceramic composition) and the first to third and fifth subcomponent materials to the obtained post-reaction material and, then, mixing and, calcining if necessary, a dielectric ceramic composition powder is obtained. As the rest of the fourth subcomponent material and the first to third and fifth subcomponent materials, the above oxides, mixture of them, composite oxides, and a variety of compounds to be the oxides and composite oxides when fired may be used.

Next, the thus obtained dielectric ceramic composition powder is used to produce dielectric layer paste. The dielectric layer paste may be organic based slurry obtained by kneading the dielectric ceramic composition powder and an organic vehicle, or water-based slurry.

An organic vehicle is obtained by dissolving a binder in an organic solvent. The binder to be used for the organic vehicle is not particularly limited and may be suitably selected from a variety of normal binders, such as ethyl cellulose and polyvinyl butyral. Also, the organic solvent to be used is not particularly limited and may be suitably selected from a variety of organic solvents, such as terpineol, butyl carbitol, acetone, and toluene, in accordance with a method to be used, such as the printing method and sheet method. Also, when using water-based slurry as a dielectric layer paste, a water-based vehicle obtained by dissolving a water-soluble binder and dispersant, etc. in water may be kneaded with a dielectric material. The water-soluble binder used for the water based vehicle is not particularly limited and, for example, polyvinyl alcohol, cellulose and water-soluble acrylic resin, etc. may be used.

The internal electrode layer paste is fabricated by kneading a conductive material formed by the above variety of conductive metals and alloys or a variety of oxides, organic metal compounds, and resinates, etc., which became the above conductive materials after firing, with the above organic vehicle.

The external electrode paste may be fabricated in the same way as the above internal electrode layer paste.

A content of the organic vehicle in the above variety of paste is not particularly limited and may be a normal content, for example, the binder may be 1 to 5 wt % or so and the solvent may be 10 to 50 wt % or so. Also, additives selected from a variety of dispersants, plasticizers, dielectrics and insulators, etc. may be included in each paste. A total content thereof is preferably 10 wt % or smaller.

When using the printing method, the dielectric layer paste and the internal electrode layer paste are stacked by printing on a substrate, such as PET, cut into a predetermined shape and removed from the substrate to obtain a green chip.

When using the sheet method, the dielectric layer paste is used to form a green sheet, the internal electrode layer paste is printed thereon and, then, the results are stacked to obtain a green chip.

Before firing, binder removal processing is performed on the green chip. As a binder removal condition, the temperature raising rate is preferably 5 to 300° C./hour and more preferably 10 to 100° C./hour, the holding temperature is preferably 180 to 400° C. and more preferably 200 to 300° C., and the temperature holding time is preferably 0.5 to 24 hours and more preferably 5 to 20 hours. The firing atmosphere at binder removal processing is preferably in the air.

Next, the green chip subjected to the binder removal processing is fired. An atmosphere at firing the green chip may be suitably determined in accordance with a kind of a conductive material in the internal electrode layer paste, but when using a base metal, such as Ni or a Ni alloy, as the conductive material, an oxygen partial pressure in the firing atmosphere is preferably $10^{-9}$ to $10^{-4}$ Pa. When the oxygen partial pressure is lower than the above range, the conductive material in the internal electrode layer results in abnormal sintering to be broken in some cases. While, when the oxygen partial pressure exceeds the above range, the internal electrode layer tends to be oxidized.

Also, the holding temperature at firing is preferably 1000 to 1400° C., and more preferably 1100 to 1350° C. When the holding temperature is lower than the above range, densification becomes insufficient, while when exceeding the above range, breakings of electrodes due to abnormal sintering of the internal electrode layer, deterioration of the capacity-temperature characteristic due to dispersion of the internal electrode layer component, and a reduction of the dielectric ceramic composition are easily caused.

As other firing condition, the temperature raising rate is preferably 100 to 900° C./hour and more preferably 200 to 900° C./hour, the temperature holding time is preferably 0.5 to 8 hours and more preferably 1 to 3 hours, and the cooling rate is preferably 50 to 500° C./hour and more preferably 200 to 300° C./hour. The firing atmosphere is preferably a reducing atmosphere and a preferable atmosphere gas is, for example, a wet mixed gas of $N_2$ and $H_2$.

When firing in a reducing atmosphere, it is preferable that annealing is performed on the capacitor element body.

Annealing is processing for re-oxidizing the dielectric layer and the IR lifetime is remarkably elongated thereby, so that the reliability is improved.

An oxygen partial pressure in the annealing atmosphere is preferably $10^{-3}$ Pa or higher, and particularly preferably to $10^{-2}$ to 10 Pa. When the oxygen partial pressure is lower than the above range, re-oxidization of the dielectric layer becomes difficult, while when exceeding the above range, the internal electrode layer tends to be oxidized.

The holding temperature at annealing is preferably 1200° C. or lower, and particularly preferably 500 to 1200° C. When the holding temperature is lower than the above range, oxidization of the dielectric layer becomes insufficient, so that the IR becomes low and the high temperature load lifetime becomes short easily. On the other hand, when the holding temperature exceeds the above range, not only the internal electrode layer is oxidized to reduce the capacity, but the internal electrode layer reacts with the dielectric base material, and deterioration of the capacity-temperature characteristics, a decline of the IR and a decline of the high temperature load lifetime are easily caused.

As other annealing conditions, the temperature raising rate is preferably 100 to 900° C./hour and more preferably 200 to 900° C./hour, the temperature holding time is preferably 0.5 to 12 hours and more preferably 1 to 10 hours, and the cooling rate is preferably 50 to 600° C./hour and more preferably 100 to 300° C./hour. Also, a preferable atmosphere gas at annealing is, for example, a wet $N_2$ gas, etc.

In the above binder removal processing, firing and annealing, for example, a wetter, etc. may be used to wet the $N_2$ gas and mixed gas, etc. In that case, the water temperature is preferably 5 to 75° C. or so. The binder removal processing, firing and annealing may be performed continuously or separately.

End surface polishing, for example, by barrel polishing or sand blast, etc. is performed on the capacitor element body obtained as above, and the external electrode paste is printed or transferred and fired to form external electrodes 4. A firing condition of the external electrode paste is preferably, for example, at 600 to 800° C. in a wet mixed gas of $N_2$ and $H_2$ for 10 minutes to 1 hour or so. A cover layer is formed by plating, etc. on the surface of the external electrodes 4 if necessary.

A multilayer ceramic capacitor of the present invention produced as above is mounted on a print substrate, etc. by soldering, etc. and used for a variety of electronic apparatuses, etc.

An embodiment of the present invention was explained above, but the present invention is not limited to the above embodiment and may be variously modified within the scope of the present invention.

For example, in the above embodiment, a multilayer ceramic capacitor was explained as an example of an electronic device according to the present invention, but an electronic device according to the present invention is not limited to the multilayer ceramic capacitor and may be any as far as it includes a dielectric layer composed of a dielectric ceramic composition having the above composition.

EXAMPLES

Below, the present invention will be explained based on furthermore detailed examples, but the present invention is not limited to the examples.

Example 1

First, as a main component material, a material powder having an average particle diameter of 0.35 μm, wherein a value of "m" in the composition formula of $Ba_mTiO_{2+m}$ is 0.991, was prepared. Also, as a fourth subcomponent material, a $Y_2O_3$ powder was prepared. Next, the prepared $Ba_mTiO_{2+m}$ powder (m=0.991) and $Y_2O_3$ powder were pulverized by wet mixing by a ball mill to form slurry, and the slurry was dried, calcined and pulverized to obtain a post-reaction material. Note that the calcination condition was a temperature raising rate of 200° C./hour, a holding temperature of 500° C., a temperature holding time of 2 hours and in the air. An adding quantity of $Y_2O_3$ was 0.05 mole in terms of Y atom (note that an amount of $Y_2O_3$ will be in terms of Y atom in examples, comparative examples and reference examples below in the present specification) with respect to 100 moles of the main component. Namely, it was 0.025 mole in terms of $Y_2O_3$.

Next, the obtained post-reaction material was added with the first to fifth subcomponent explained below and pulverized by wet mixing by a ball mill to form slurry. The slurry was dried, then, calcined and pulverized to obtain a dielectric ceramic composition powder. Note that an adding quantity of each of the subcomponents is calculated as a conversion of each oxide (note that an adding quantity of $Y_2O_3$ was calculated as a conversion of Y atom) with respect to 100 moles of the main component.

MgO (first subcomponent): 1.2 moles
(Ba, Ca)SiO$_3$ (second subcomponent): 0.75 mole
$V_2O_5$ (third subcomponent): 0.03 mole
$Y_2O_3$ (fourth subcomponent): 0.35 mole
MnO (fifth subcomponent): 0.2 mole Namely, BaO is included in $(Ba_{0.6}Ca_{0.4})SiO_3$ (hereinafter, also referred to as BCG) as the second subcomponent and the adding quantity is 0.44 mole in terms of BaO. Therefore, in the composition formula of $Ba_{m+n/100}TiO_{2+m+n/100}$, a value of "m+n/100" becomes 0.995.

The thus obtained dielectric ceramic composition powder in an amount of 100 parts by weight, an acrylic resin in an amount of 4.8 parts by weight, ethyl acetate in an amount of 100 parts by weight, mineral spirit in an amount of 6 parts by weight and toluene in an amount of 4 parts by weight were mixed by a ball mill to form paste, so that dielectric layer paste was obtained.

Next, Ni particles in an amount of 44.6 parts by weight, terpineol in an amount of 52 parts by weight, ethyl cellulose in an amount of 3 parts by weight, benzotriazole in an amount of 0.4 part by weight were kneaded by a triple-roll to form slurry, so that internal electrode layer paste was obtained.

These pastes were used to produce the multilayer ceramic chip capacitor 1 shown in FIG. 1.

First, the obtained dielectric layer paste was used to form a green sheet on a PET film. After printing the internal electrode paste thereon, the sheet was removed from the PET film. Next, the green sheets and protective green sheets (without the internal electrode layer paste printed thereon) were stacked and bonded by pressure, so that a green multilayer body was obtained.

Next, the green multilayer body was cut into a predetermined size to obtain a green chip and subjected to binder removal processing, firing and annealing under the conditions below, so that a multilayer ceramic fired body was obtained.

The binder removal processing condition was a temperature raising rate of 32.5° C./hour, holding temperature of 260° C., the temperature holding time of 8 hours and in the air.

The firing condition was a temperature raising rate of 200° C./hour, holding temperature of 1260 to 1280° C., the temperature holding time of 2 hours, cooling rate of 200° C./hour, and an atmosphere of a wet mixed gas of $N_2+H_2$ (oxygen partial pressure was $10^{-7}$ Pa).

The annealing condition was a temperature raising rate of 200° C./hour, holding temperature of 1050° C., the temperature holding time of 2 hours, cooling rate of 200° C./hour, and an atmosphere of a wet $N_2$ gas (oxygen partial pressure was 1.01 Pa).

Note that a wetter with a water temperature of 20° C. was used to wet the atmosphere gases at firing and annealing.

Next, end surfaces of the obtained multilayer ceramic fired body were polished by sand blast and, then, an In—Ga alloy was applied as external electrodes, so that samples of multilayer ceramic capacitor as an example 1 shown in FIG. 1 were obtained.

A size of the obtained capacitor samples was 3.2 mm×1.6 mm×0.6 mm, the number of dielectric layers sandwiched by the internal electrode layers was 4, a thickness (interlayer thickness) of one dielectric layer was 4.5 μm, and a thickness of one internal electrode layer was 1.2 μm. Next, on the obtained capacitor samples, an average crystal grain diameter of dielectric particles, specific permittivity ∈, a dielectric loss tan δ, insulation resistance IR, a CR product, a temperature characteristic of capacitance and an IR accelerated lifetime were evaluated by the methods explained below. Also, a distribution degree of a Y element was measured by an XPS measurement on the above post-reaction material.

Average Crystal Grain Diameter of Dielectric Particles

A method of measuring an average particle diameter of the dielectric particles was cutting an obtained capacitor sample on a surface perpendicular to internal electrodes first, polishing the cut surface, then, performing chemical etching on the polished surface, observing by a scanning electron microscope (SEM) and calculating by the code method on an assumption that shapes of the dielectric particles are spheres. The results are shown in Table 1.

Specific Permittivity ∈

On each of the capacitor samples, capacitance C was measured under a condition of a reference temperature of 20° C., using a digital LCR meter (YHP4274A made by Yokogawa Electric Corporation), a frequency of 120 Hz and an input signal level (measurement voltage) of 0.5Vrms/μm. Then, specific permittivity (no unit) was calculated from the obtained capacitance, a dielectric thickness and a superimposing area of internal electrodes in the multilayer ceramic capacitor. The higher the specific permittivity is, the more preferable. The results are shown in Table 1.

Dielectric Loss Tan δ

On each of the capacitor samples, a dielectric loss tan δ was measured under a condition of a reference temperature of 20° C., using a digital LCR meter (YHP4274A made by Yokogawa Electric Corporation), a frequency of 120 Hz and an input signal level (measurement voltage) of 0.5Vrms/μm. The smaller the dielectric loss is, the more preferable. The results are shown in Table 1.

Insulation Resistance IR

On each of the capacitor samples, insulation resistance IR was measured by using an insulation resistance tester (RB340A made by Advantest Corporation) after applying a direct current voltage of 4V/μm for one minute at 20° C. The larger the insulation resistance IR is, the more preferable. The results are shown in Table 1.

CR Product

A CR product was measured by obtaining a product of the capacitance (unit: μF) and insulation resistance IR (unit: MΩ) measured as explained above. The larger the CR product is, the more preferable. The results are shown in Table 1.

Temperature Characteristic of Capacitance

On each of the capacitor samples, capacitance at −55 to 125° C. was measured and a change rate ΔC of the capacitance was calculated to evaluate whether the X7R characteristics of the EIA standard are satisfied or not. Namely, evaluation was made on whether the change rate AC was within ±15% or not at −55 to 125° C. The results are shown in Table 1. Note that samples satisfied the X7R characteristics were marked with "good" and those not satisfied were marked with "poor" in Table 1.

IR Accelerated Lifetime

On each of the capacitor samples, an acceleration test was conducted under an electric field of 20V/μm at 180° C., and time (unit: hour) until the insulation resistance IR becomes $10^8 \Omega$ or lower was calculated. The longer the IR accelerated lifetime is, the more preferable. The results are shown in Table 1.

Measurement of Distribution Degree of Y Atoms in Post-Reaction Material

On the post-reaction material obtained by reacting the $Ba_m TiO_{2+m}$ powder (m=0.991) with the $Y_2O_3$ powder, a distribution state of each element of Ba, Ti and Y in the surface depth direction was measured by the XPS measurement. From results of the XPS measurement, each of the Ba, Ti and Y elements was distributed at almost the same concentration from a part close to the surface to inside thereof, and it was confirmed that a solid dispersion reaction proceeded uniformly.

Examples 2 to 6

Comparative Examples 1-1 and 2-1

Other than changing a value of "m" in the $Ba_m TiO_{2+m}$ powder as the main component material to the values shown in Table 1 when producing a dielectric ceramic composition powder to obtain a post-reaction material, a dielectric ceramic composition powder was obtained in the same way as in the example 1 and capacitor samples of examples 2 to 6 and comparative examples 1-1 and 2-1 were obtained. Each of the obtained capacitor samples was evaluated on their characteristics. The results are shown in Table 1.

TABLE 1

| | Main Component $Ba_m TiO_{2+m}$ m | Adding Quantity of Subcomponent BaO n [mol] | $Ba_{m+n/100} TiO_{2+m+n/100}$ m + n/100 | Adding Quantity of Fourth Subcomponent [mol] | | Sintered Body Crystal Grain Diameter [μm] |
|---|---|---|---|---|---|---|
| | | | | Pre-added ($Y_2O_3$) | Post-added ($Y_2O_3$) | |
| Comparative Example 1-1 | 0.990 | 0.44 | 0.994 | 0.05 | 0.35 | 0.40 |
| Example 1 | 0.991 | 0.44 | 0.995 | 0.05 | 0.35 | 0.39 |
| Example 2 | 0.995 | 0.44 | 0.999 | 0.05 | 0.35 | 0.35 |
| Example 3 | 1.000 | 0.44 | 1.004 | 0.05 | 0.35 | 0.31 |
| Example 4 | 1.005 | 0.44 | 1.009 | 0.05 | 0.35 | 0.32 |
| Example 5 | 1.007 | 0.44 | 1.011 | 0.05 | 0.35 | 0.32 |
| Example 6 | 1.009 | 0.44 | 1.013 | 0.05 | 0.35 | 0.33 |
| Comparative Example 2-1 | 1.010 | 0.44 | 1.014 | 0.05 | 0.35 | 0.34 |

TABLE 1-continued

|  | Specific Permittivity ε | tan δ [%] | IR [Ω · m] | CR Product [μF · MΩ] | X7R Characteristics | IR Lifetime [h] |
|---|---|---|---|---|---|---|
| Comparative Example 1-1 | 4700 | 10.5 | 1.24E+11 | 5160 | poor | 0.80 |
| Example 1 | 4800 | 11.4 | 1.36E+11 | 5780 | good | 1.0 |
| Example 2 | 5100 | 12.4 | 1.32E+11 | 5961 | good | 1.9 |
| Example 3 | 4800 | 8.2 | 1.24E+11 | 5270 | good | 1.6 |
| Example 4 | 4000 | 3.6 | 1.36E+11 | 4817 | good | 1.3 |
| Example 5 | 3800 | 3.4 | 1.40E+11 | 4630 | good | 0.80 |
| Example 6 | 3600 | 3.3 | 1.40E+11 | 4462 | good | 0.20 |
| Comparative Example 2-1 | 3400 | 3.3 | 1.36E+11 | 4094 | good | 0.13 |

In the Table, "aE+b" mean "a × $10^{+b}$".
Adding quantity of the fourth subcomponent is in terms of Y atom.

Evaluation 1

It was confirmed from Table 1 that, in all of the capacitor samples of the examples 1 to 6 expressed by a composition formula $Ba_mTiO_{2+m}$, wherein a value of "m" is 0.991 to 1.009, the specific permittivity became high as 3500 or hither and other characteristics (a dielectric loss tan δ, insulation resistance IR, CR product, a temperature characteristic of capacitance and IR accelerated lifetime) also became preferable.

On the other hand, in the comparative example 1-1, wherein a value of "m" is 0.990, an average crystal grain diameter of dielectric particles after sintering became large as 0.40 μm and, moreover, a temperature characteristic of the capacitance became poor.

In the comparative example 2-1, wherein a value of "m" was 1.010, the specific permittivity became low as 3400 and it was confirmed to be hard to respond to attaining of a compact body with a larger capacity.

From the above result, when comparing the examples 1 to 6 with the comparative examples 1-1 and 2-1, by setting the value of "m" in the composition formula of $Ba_mTiO_{2+m}$ to be in a range of 0.990<m<1.010, specific permittivity can become high while maintaining other electric characteristics (a dielectric loss tan δ, insulation resistance IR, CR product, a temperature characteristic of capacitance and IR accelerated lifetime) preferable.

Example 1a and Comparative Examples 1b and 1c

Other than setting an adding quantity of BaO to the values shown in Table 2 by changing an adding quantity of BCG of the second subcomponent used in the example 1, a post-reaction material was obtained in the same way as in the example 1, furthermore, a dielectric ceramic composition powder was produced, and respective capacitor samples were obtained. Namely, a material powder, wherein a value of "m" was 0.991 in a $Ba_mTiO_{2+m}$, was used as the main component and a $Y_2O_3$ powder was used as a material of the fourth subcomponent. Each of the obtained capacitor samples was evaluated on the characteristics in the same way as in the example 1. The results are shown in Table 2.

Examples 2a and 3a to 3c and Comparative Examples 3d and 6a

Other than setting an adding quantity of BaO to the values shown in Table 2 by changing an adding quantity of BCG of the second subcomponent used in the examples 2 to 4 and 6, a post-reaction material was obtained in the same way as in the example 1, furthermore, a dielectric ceramic composition powder was produced, and respective capacitor samples were obtained. Each of the obtained capacitor samples was evaluated on the characteristics in the same way as in the example 1. The results are shown in Table 2.

Comparative Examples 1-2 and 2-2

Other than setting an adding quantity of BaO to the values shown in Table 2 by changing an adding quantity of BCG of the second subcomponent used in the comparative examples 1 and 2, a post-reaction material was obtained in the same way as in the example 1, furthermore, a dielectric ceramic composition powder was produced, and respective capacitor samples were obtained. Each of the obtained capacitor samples was evaluated on the characteristics in the same way as in the example 1. The results are shown in Table 2.

TABLE 2

|  | Main Component $Ba_mTiO_{2+m}$ m | Adding Quantity of Subcomponent BaO n [mol] | $Ba_{m+n/100}TiO_{2+m+n/100}$ m + n/100 | Adding Quantity of Fourth Subcomponent [mol] Pre-added ($Y_2O_3$) | Adding Quantity of Fourth Subcomponent [mol] Post-added ($Y_2O_3$) | Sintered Body Crystal Grain Diameter [μm] |
|---|---|---|---|---|---|---|
| Comparative Example 1-1 | 0.990 | 0.44 | 0.994 | 0.05 | 0.35 | 0.40 |
| Comparative Example 1-2 | 0.990 | 1.00 | 1.000 | 0.05 | 0.35 | 0.38 |
| Comparative Example 1b | 0.991 | 0.30 | 0.994 | 0.05 | 0.35 | 0.58 |
| Example 1 | 0.991 | 0.44 | 0.995 | 0.05 | 0.35 | 0.39 |
| Example 1a | 0.991 | 2.20 | 1.013 | 0.05 | 0.35 | 0.36 |
| Comparative Example 1c | 0.991 | 2.30 | 1.014 | 0.05 | 0.35 | 0.35 |

TABLE 2-continued

| | | | | | | |
|---|---|---|---|---|---|---|
| Example 2 | 0.995 | 0.44 | 0.999 | 0.05 | 0.35 | 0.35 |
| Example 2a | 0.995 | 0.60 | 1.001 | 0.05 | 0.35 | 0.35 |
| Example 3a | 1.000 | 0.20 | 1.002 | 0.05 | 0.35 | 0.31 |
| Example 3 | 1.000 | 0.44 | 1.004 | 0.05 | 0.35 | 0.31 |
| Example 3b | 1.000 | 0.60 | 1.006 | 0.05 | 0.35 | 0.33 |
| Example 3c | 1.000 | 1.20 | 1.012 | 0.05 | 0.35 | 0.33 |
| Comparative Example 3d | 1.000 | 1.40 | 1.014 | 0.05 | 0.35 | 0.31 |
| Example 4 | 1.005 | 0.44 | 1.009 | 0.05 | 0.35 | 0.32 |
| Example 5 | 1.007 | 0.44 | 1.011 | 0.05 | 0.35 | 0.32 |
| Example 6 | 1.009 | 0.44 | 1.013 | 0.05 | 0.35 | 0.33 |
| Comparative Example 6a | 1.009 | 0.51 | 1.014 | 0.05 | 0.35 | 0.30 |
| Comparative Example 2-1 | 1.010 | 0.44 | 1.014 | 0.05 | 0.35 | 0.34 |
| Comparative Example 2-2 | 1.010 | 0.20 | 1.012 | 0.05 | 0.35 | 0.35 |

| | Specific Permittivity $\epsilon$ | tan δ [%] | IR [Ω · m] | CR Product [μF · MΩ] | X7R Characteristics | IR Lifetime [h] |
|---|---|---|---|---|---|---|
| Comparative Example 1-1 | 4700 | 10.5 | 1.24E+11 | 5160 | poor | 0.80 |
| Comparative Example 1-2 | 4300 | 9.5 | 1.36E+11 | 5178 | poor | 1.0 |
| Comparative Example 1b | 5400 | 15.5 | 1.36E+11 | 6502 | poor | 1.0 |
| Example 1 | 4800 | 11.4 | 1.36E+11 | 5780 | good | 1.0 |
| Example 1a | 3600 | 9.6 | 1.36E+11 | 4335 | good | 1.0 |
| Comparative Example 1c | 3400 | 8.5 | 1.36E+11 | 4094 | good | 1.0 |
| Example 2 | 5100 | 12.4 | 1.32E+11 | 5961 | good | 1.9 |
| Example 2a | 4800 | 10.3 | 1.32E+11 | 5610 | good | 1.7 |
| Example 3a | 5200 | 9.6 | 1.20E+11 | 5525 | good | 1.8 |
| Example 3 | 4800 | 8.2 | 1.24E+11 | 5270 | good | 1.6 |
| Example 3b | 4600 | 7.3 | 1.28E+11 | 5213 | good | 1.4 |
| Example 3c | 3600 | 5.3 | 1.38E+11 | 4399 | good | 1.2 |
| Comparative Example 3d | 3400 | 5.1 | 1.40E+11 | 4215 | good | 1.1 |
| Example 4 | 4000 | 3.6 | 1.36E+11 | 4817 | good | 1.3 |
| Example 5 | 3800 | 3.4 | 1.40E+11 | 4630 | good | 0.80 |
| Example 6 | 3600 | 3.3 | 1.40E+11 | 4462 | good | 0.20 |
| Comparative Example 6a | 3200 | 2.8 | 1.40E+11 | 3967 | good | 0.20 |
| Comparative Example 2-1 | 3400 | 3.3 | 1.36E+11 | 4094 | good | 0.13 |
| Comparative Example 2-2 | 2800 | 2.5 | 1.34E+11 | 3322 | good | 0.14 |

In the Table, "aE+b" means "a × $10^{+b}$".
Adding quantity of the fourth subcomponent is in terms of Y atom.

Evaluation 2

From Table 2, when comparing the examples 1 and 1a with the comparative examples 1b and 1a, the values of "m" in their main components are all 0.991, which is in a range of the present invention. However, since adding quantities of BaO are different, values of "m+n/100" were in the range of the present invention in samples of the examples, while, out of the range of the present invention in samples of the comparative examples. As a result, the samples of the examples exhibited good characteristics in all of the specific permittivity, dielectric loss, IR, IR lifetime and capacity-temperature characteristic, etc., and it was confirmed that specific characteristics became furthermore preferable due to values of "m" and "m+n/100". On the other hand, the samples of the comparative examples exhibited results that a crystal grain diameter of a sintered body was large, the capacity-temperature characteristic declined (the comparative example 1b), and the specific permittivity was low (the comparative example 1c). In the same way, in the case where a value of "m" in the main component was 1.000, 1.005 and 1.009, all of samples of the examples exhibited preferable characteristics, while samples of the comparative examples exhibited deterioration in at least one characteristic. Accordingly, by setting a value of "m" in the main component to be in a specific range and setting a value of "m+n/100" to be in a specific range, it was confirmed that a desired characteristic can become preferable while maintaining a variety of characteristics at high levels.

On the other hand, when comparing the comparative example 1-1 with 1-2, neither of them satisfied the X7R characteristics and the characteristics were not preferable in the case, where both of the value of "m" and a value of "m+n/100" in the main component were out of the ranges of the present invention, (the comparative example 1-1) and in the case, where the value of "m+n/100" was in the range of the present invention, (the comparative example 1-2). Accordingly, it was confirmed that even when the value of "m+n/100" was in the range of the present invention, preferable characteristics cannot be maintained when the value of "m" in the main component was out of the range of the present invention.

Examples 7 to 9

Comparative Example 7 and Reference Examples 1 and 2

Other than setting an amount of $Y_2O_3$ to be reacted in advance with a material of the main component and an amount of $Y_2O_3$ to be added later on to the values shown in Table 3 in terms of Y atom when producing a dielectric ceramic composition powder, a dielectric ceramic composition powder was obtained in the same way as in the example 3, and respective capacitor samples were obtained. Each of the obtained capacitor samples was evaluated on the characteristics in the same way as in the example 1. A value of "m" in the composition formula of $Ba_mTiO_{2+m}$ of the main component material was 1.000, and a value of "m+n/100" in the composition formula of $Ba_{m+n/100}TiO_{2+m+n/100}$ was 1.004. The results are shown in Table 3.

It was confirmed from the above results that, when comparing the examples 7 to 9 with the comparative example 7, by bringing the main component to react in advance with a part of the fourth subcomponent ($Y_2O_3$), the specific permittivity became high while maintaining other electric characteristics (a dielectric loss tan δ, insulation resistance IR, CR product, temperature characteristic of capacitance and IR accelerated lifetime) high. Also, by comparing the examples 7 to 9 with the reference examples 1 and 2, it was confirmed that, when producing a post-reaction material by reacting the main com-

TABLE 3

| | Main Component $Ba_mTiO_{2+m}$ m | Adding Quantity of Subcomponent BaO n [mol] | $Ba_{m+n/100}TiO_{2+m+n/100}$ m + n/100 | Adding Quantity of Fourth Subcomponent [mol] | | Sintered Body Crystal Grain Diameter [μm] |
|---|---|---|---|---|---|---|
| | | | | Pre-added ($Y_2O_3$) | Post-added ($Y_2O_3$) | |
| Comparative Example 7 | 1.000 | 0.44 | 1.004 | 0 | 0.40 | 0.29 |
| Example 7 | 1.000 | 0.44 | 1.004 | 0.02 | 0.38 | 0.30 |
| Example 3 | 1.000 | 0.44 | 1.004 | 0.05 | 0.35 | 0.31 |
| Example 8 | 1.000 | 0.44 | 1.004 | 0.10 | 0.30 | 0.31 |
| Example 9 | 1.000 | 0.44 | 1.004 | 0.15 | 0.25 | 0.35 |
| Reference Example 1 | 1.000 | 0.44 | 1.004 | 0.25 | 0.15 | 0.37 |
| Reference Example 2 | 1.000 | 0.44 | 1.004 | 0.40 | 0 | 0.78 |

| | Specific Permittivity ε | tan δ [%] | IR [Ω·m] | CR Product [μF·MΩ] | X7R Characteristics | IR Lifetime [h] |
|---|---|---|---|---|---|---|
| Comparative Example 7 | 3400 | 4.6 | 1.20E+11 | 3610 | good | 0.80 |
| Example 7 | 4000 | 6.8 | 1.20E+11 | 4250 | good | 1.1 |
| Example 3 | 4800 | 8.2 | 1.24E+11 | 5270 | good | 1.6 |
| Example 8 | 4928 | 11.7 | 1.20E+11 | 5240 | good | 0.80 |
| Example 9 | 4600 | 10.0 | 1.20E+11 | 4890 | good | 0.18 |
| Reference Example 1 | 4400 | 12.5 | 1.16E+11 | 4520 | poor | 0.08 |
| Reference Example 2 | 5550 | 25.2 | 2.80E+10 | 1380 | poor | 0.10 |

In the Table, "aE+b" means "a × $10^{+b}$".
Adding quantity of the fourth subcomponent is in terms of Y atom.

Evaluation 3

It was confirmed from Table 3 that, in all of capacitor samples of the examples 7 to 9, wherein the main component and a part of $Y_2O_3$ were reacted in advance to obtain a post-reaction material and remaining $Y_2O_3$ was added to the post-reaction material, specific permittivity became as high as 4000 or higher and other electric characteristics (a dielectric lose tan δ, insulation resistance IR, a CR product, a temperature characteristic of capacitance and an IR accelerated lifetime) also became preferable.

On the other hand, in the comparative example 7, wherein the main component and $Y_2O_3$ were not reacted in advance, the specific permittivity became low as 3400 and it was confirmed to be hard to respond to attaining of a compact body with a larger capacity.

Also, the reference example 1 exhibited results of relatively high specific permittivity but poor temperature characteristic of capacitance and IR accelerated lifetime.

In the reference example 2, wherein the main component and a total amount of $Y_2O_3$ (the fourth subcomponent) were reacted in advance, an average crystal grain diameter of dielectric particles after sintering became large as 0.78 μm and poor results were exhibited in the dielectric loss, insulation resistance, CR product, a temperature characteristic of capacitance and IR accelerated lifetime.

ponent in advance with a part of the fourth subcomponent ($Y_2O_3$), it is preferable that an amount of the fourth subcomponent ($Y_2O_3$) is in the preferable range of the present invention as explained above and that the rest of the fourth subcomponent ($Y_2O_3$) is furthermore added to the obtained post-reaction material.

Example 10 to 13 and Reference Examples 3 and 4

Other than using $Tb_2O_{3.5}$ instead of $Y_2O_3$ as a material of the fourth subcomponent to be reacted in advance with the main component material, capacitor samples of examples 10 to 13 and reference examples 3 and 4 were produced in the same way as in the examples 7 to 9 and the reference examples 1 and 2. Namely, in the examples 10 to 13 and reference examples 3 and 4, $Tb_2O_{3.5}$ was used as a (pre-added) fourth subcomponent to be reacted in advance and $Y_2O_3$ was used as a (post-added) fourth subcomponent to be added to the obtained post-reaction material. Each of the obtained capacitor samples was evaluated on the characteristics in the same way as in the example 1. The results are shown in Table 4.

TABLE 4

|  | Main Component $Ba_mTiO_{2+m}$ m | Adding Quantity of Subcomponent BaO n [mol] | $Ba_{m+n/100}TiO_{2+m+n/100}$ m + n/100 | Adding Quantity of Fourth Subcomponent [mol] | | Sintered Body Crystal Grain Diameter [μm] |
|---|---|---|---|---|---|---|
|  |  |  |  | Pre-added ($Tb_2O_{3.5}$) | Post-added ($Y_2O_3$) |  |
| Example 10 | 1.000 | 0.44 | 1.004 | 0.02 | 0.38 | 0.29 |
| Example 11 | 1.000 | 0.44 | 1.004 | 0.05 | 0.35 | 0.30 |
| Example 12 | 1.000 | 0.44 | 1.004 | 0.10 | 0.30 | 0.30 |
| Example 13 | 1.000 | 0.44 | 1.004 | 0.15 | 0.25 | 0.34 |
| Reference Example 3 | 1.000 | 0.44 | 1.004 | 0.25 | 0.15 | 0.37 |
| Reference Example 4 | 1.000 | 0.44 | 1.004 | 0.40 | 0 | 0.84 |

|  | Specific Permittivity ε | tan δ [%] | IR [Ω·m] | CR Product [μF·MΩ] | X7R Characteristics | IR Lifetime [h] |
|---|---|---|---|---|---|---|
| Example 10 | 3640 | 6.5 | 1.32E+11 | 4250 | good | 1.1 |
| Example 11 | 4650 | 8.6 | 1.32E+11 | 5440 | good | 1.5 |
| Example 12 | 4800 | 12.1 | 1.24E+11 | 5270 | good | 0.90 |
| Example 13 | 4800 | 11.1 | 1.16E+11 | 4930 | good | 0.20 |
| Reference Example 3 | 4500 | 13.3 | 1.16E+11 | 4620 | poor | 0.07 |
| Reference Example 4 | 6200 | 28.4 | 2.48E+10 | 1360 | poor | 0.05 |

In the Table, "aE+b" means "a × $10^{+b}$".
Adding quantity of the fourth subcomponent is in terms of Y and Tb atoms.

Evaluation 4

It was confirmed from Table 4 that the same tendency was obtained also in the case of using $Tb_2O_{3.5}$ instead of $Y_2O_3$ as the fourth subcomponent to be reacted in advance with the main component material.

Examples 14 to 17 and Reference Examples 5 and 6

Other than using $Y_2O_3$ instead of $Y_2O_3$ as a material of the fourth subcomponent to be reacted in advance with the main component material, capacitor samples of examples 14 to 17 and reference examples 5 and 6 were produced in the same way as in the examples 7 to 10 and the reference examples 1 and 2. Namely, in the examples 14 to 17 and reference examples 5 and 6, $Y_2O_3$ was used as a (pre-added) fourth subcomponent to be reacted in advance and $Y_2O_3$ was used as a (post-added) fourth subcomponent to be added to the obtained post-reaction material. Each of the obtained capacitor samples was evaluated on the characteristics in the same way as in the example 1. The results are shown in Table 5.

TABLE 5

|  | Main Component $Ba_mTiO_{2+m}$ m | Adding Quantity of Subcomponent BaO n [mol] | $Ba_{m+n/100}TiO_{2+m+n/100}$ m + n/100 | Adding Quantity of Fourth Subcomponent [mol] | | Sintered Body Crystal Grain Diameter [μm] |
|---|---|---|---|---|---|---|
|  |  |  |  | Pre-added ($Y_2O_3$) | Post-added ($Y_2O_3$) |  |
| Example 14 | 1.000 | 0.440 | 1.004 | 0.02 | 0.38 | 0.31 |
| Example 15 | 1.000 | 0.440 | 1.004 | 0.05 | 0.35 | 0.31 |
| Example 16 | 1.000 | 0.440 | 1.004 | 0.10 | 0.30 | 0.34 |
| Example 17 | 1.000 | 0.440 | 1.004 | 0.15 | 0.25 | 0.35 |
| Reference Example 5 | 1.000 | 0.440 | 1.004 | 0.25 | 0.15 | 0.36 |
| Reference Example 6 | 1.000 | 0.440 | 1.004 | 0.40 | 0 | 0.65 |

|  | Specific Permittivity ε | tan δ [%] | IR [Ω·m] | CR Product [μF·MΩ] | X7R Characteristic | IR Lifetime [h] |
|---|---|---|---|---|---|---|
| Example 14 | 3700 | 6.2 | 1.48E+11 | 4850 | good | 1.2 |
| Example 15 | 4500 | 8.5 | 1.48E+11 | 5900 | good | 1.3 |
| Example 16 | 4300 | 10.2 | 1.40E+11 | 5330 | good | 1.0 |
| Example 17 | 4500 | 10.5 | 1.32E+11 | 5260 | good | 1.0 |

TABLE 5-continued

|  | | | | | | |
|---|---|---|---|---|---|---|
| Reference Example 5 | 4700 | 11.0 | 1.20E+11 | 4990 | poor | 0.07 |
| Reference Example 6 | 5500 | 17.0 | 3.56E+10 | 1730 | poor | 0.06 |

In the Table, "aE+ b" means "a × $10^{+bn}$".
Adding quantity of the fourth subcomponent is in terms of Y and Yb atoms.

Evaluation 5

It was confirmed from Table 5 that the same tendency was obtained also in the case of using $Yb_2O_3$ instead of $Y_2O_3$ as the fourth subcomponent to be reacted in advance with the main component material.

Examples 18 to 21

Other than using $Dy_2O_3$, $Ho_2O_3$, $Gd_2O_3$ and $Eu_2O_3$ instead of $Y_2O_3$ as a material of the fourth subcomponent to be reacted in advance with the main component material, capacitor samples of examples 18 to 21 were produced in the same way as in the example 3. Namely, $Dy_2O_3$ was used as a (pre-added) fourth subcomponent to be reacted in advance in the example 18, $Ho_2O_3$ was used as a (pre-added) fourth subcomponent to be reacted in advance in the example 19, $Gd_2O_3$ was used as a (pre-added) fourth subcomponent to be reacted in advance in the example 20 and $Eu_2O_3$ was used as a (pre-added) fourth subcomponent to be reacted in advance in the example 21. In all of the examples 18 to 21, $Y_2O_3$ was used as a (post-added) fourth subcomponent to be added to the obtained post-reaction material. Each of the obtained capacitor samples was evaluated on the characteristics in the same way as in the example 1. The results are shown in Table 6.

TABLE 6

| | Main | Adding Quantity of Subcomponent | | Fourth Subcomponent | | | |
|---|---|---|---|---|---|---|---|
| | | | | Pre-added | | Post-Added | |
| | Component $Ba_mTiO_{2+m}$ m | BaO n [mol] | $Ba_{m+n/100}TiO_{2+m+n/100}$ m + n/100 | Adding Kind | Adding Quantity [mol] | Adding Kind | Adding Quantity [mol] |
| Example 18 | 1.000 | 0.44 | 1.004 | $Dy_2O_3$ | 0.05 | $Y_2O_3$ | 0.35 |
| Example 19 | 1.000 | 0.44 | 1.004 | $Ho_2O_3$ | 0.05 | $Y_2O_3$ | 0.35 |
| Example 20 | 1.000 | 0.44 | 1.004 | $Gd_2O_3$ | 0.05 | $Y_2O_3$ | 0.35 |
| Example 21 | 1.000 | 0.44 | 1.004 | $Eu_2O_3$ | 0.05 | $Y_2O_3$ | 0.35 |

| | Sintered Body Crystal Grain Diameter [μm] | Specific Permittivity ε | tan δ [%] | IR [Ω · m] | CR Product [μF · MΩ] | X7R Characteristics | IR Lifetime [h] |
|---|---|---|---|---|---|---|---|
| Example 18 | 0.32 | 3700 | 6.2 | 1.48E+11 | 4850 | good | 1.6 |
| Example 19 | 0.30 | 4500 | 8.5 | 1.48E+11 | 5900 | good | 1.3 |
| Example 20 | 0.33 | 4600 | 10.2 | 1.40E+11 | 5700 | good | 2.0 |
| Example 21 | 0.31 | 3800 | 10.5 | 1.32E+11 | 4440 | good | 1.8 |

In the Table, "aE+b" means a × $10^{+b}$
Adding quantity of the fourth subcomponent is in terms of R atoms.

Evaluation 6

From Table 6, the same results as those in the case of using $Y_2O_3$ were obtained also in the case of using the above rare-earth oxides instead of $Y_2O_3$ as a fourth subcomponent to be reacted.

What is claimed is:

1. A production method of a dielectric ceramic composition comprising
   a main component including barium titanate expressed by a composition formula of $Ba_mTiO_{2+m}$, wherein "m" satisfies 0.990<m<1.010,
   a fourth subcomponent including an oxide of R, wherein R is at least one selected from the group consisting of Y, La, Ce, Pr, Nd, Pm, Sm, Eu, Gd, Tb, Dy, Ho, Er, Tm, Yb and Lu, and
   other subcomponent including at least BaO;
   comprising steps of:
   preparing a post-reaction material by bringing a material of said main component to react with a part of a material of said fourth subcomponent to be included in said dielectric ceramic composition in advance of a step of firing;
   obtaining a material of said dielectric ceramic composition by adding rest of the material of said fourth subcomponent to be included in said dielectric ceramic composition into said post-reaction material; and
   firing said material of said dielectric ceramic composition,
   wherein an amount of BaO included in said other subcomponent is n mole with respect to 100 moles of said main component and said main component and said BaO are expressed by a composition formula of $Ba_{m+n/100}TiO_{2+m+n/100}$, wherein "m" and "n" satisfy 0.994<m+n/100<1.014, and
   wherein in said step for preparing the post-reaction material, a content of said fourth subcomponent to be brought to react with the material of said main component is 0.01 mole to 0.2 mole with respect to 100 moles of said main component in terms of R.

2. The production method of a dielectric ceramic composition as set forth in claim 1, wherein said post-reaction material is obtained by solid state reaction between the material of said main component and the part of the material of said fourth subcomponent.

3. The production method of a dielectric ceramic composition as set forth in claim 1, wherein a content of said fourth subcomponent in said dielectric ceramic composition to be obtained finally is 0.1 to 10 moles with respect to 100 moles of said main component in terms of R.

4. The production method of a dielectric ceramic composition as set forth in claim 1, wherein in said step for preparing the post-reaction material, a ratio of said fourth subcomponent to be brought to react with the material of said main component is larger than 0 mol % and smaller than 50 mol % with respect to 100 mol % of a total amount of said fourth subcomponent to be finally included in said dielectric ceramic composition in terms of R.

5. The production method of a dielectric ceramic composition as set forth in claim 1, wherein
said other subcomponent includes a first subcomponent, a second subcomponent and a third subcomponent,
said first subcomponent includes at least one selected from the group consisting of MgO, GaO, BaO and SrO,
said second subcomponent includes $SiO_2$ mainly and at least one selected from the group consisting of MO, $Li_2O$ and $B_2O_3$, wherein M is at least one selected from the group consisting of Mg, Ca, Ba and Sr, and
a third subcomponent includes at least one selected from the group consisting of $V_2O_5$, $MoO_3$ and $WO_3$; and
ratios of the respective subcomponents with respect to 100 moles of said main component are
the first subcomponent: 0.1 to 5 moles,
the second subcomponent: 0.1 to 12 moles, and
the third subcomponent: more than 0 to 0.3 mole.

6. The production method of a dielectric ceramic composition as set forth in claim 5, wherein
said other subcomponent furthermore includes a fifth subcomponent including at least one selected from the group consisting of MnO and $Cr_2O_3$, and
a ratio of the fifth subcomponent with respect to 100 moles of said main component is 0.05 to 1.0 mole.

7. The production method of a dielectric ceramic composition as set forth in claim 1, wherein a material having an average particle diameter of 0.05 to 0.5 μm is used as the material of said main component.

* * * * *